Nov. 1, 1955    R. J. ASPEEK    2,722,072
POWER-OPERATED HAND TOOL FOR
SCRAPING AND FEATHERING
Filed May 26, 1953

INVENTOR
REGINALD JAMES ASPEEK
BY
Maybee & Legris.
ATTORNEYS

United States Patent Office 2,722,072
Patented Nov. 1, 1955

2,722,072

POWER-OPERATED HAND TOOL FOR SCRAPING AND FEATHERING

Reginald James Aspeek, Toronto, Ontario, Canada

Application May 26, 1953, Serial No. 357,609

6 Claims. (Cl. 41—1)

This invention relates to power operated hand tools for scraping and "feathering" the surfaces of metal sheets.

It is common practice in forming flat metal surfaces of optimum flatness to scrape the surface of the metal with a hand tool in those areas which are above the flat datum level. It is also a common practice to finish some metal surfaces, for example, parts of machine tools, with a slight surface irregularity known as "feathering." This is commonly done by hand, the operator by a wrist movement so guiding the scraping tool that the "feathered" appearance is obtained.

Both the hand scraping and the feathering operations referred to above are highly skilled operations, which can successfully be done only by operators of extensive experience. Furthermore, the operations are tedious and tiresome.

It is the main object of the present invention to provide a power operated hand tool whereby scraping and "feathering" can be accomplished by an operator having a minimum amount of skill and experience and who, practically speaking, merely guides the tool.

The foregoing and still further objects and advantages of the invention will become apparent from a study of the following specification, taken in conjunction with the accompanying drawings, in which like reference characters indicate corresponding parts throughout the several views and in which.

Figure 1:
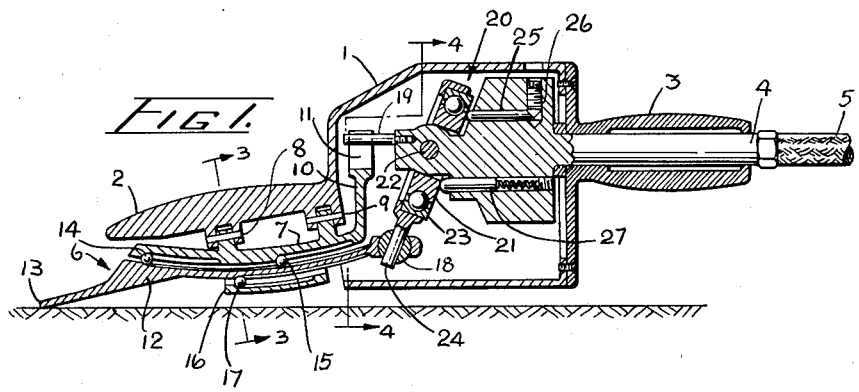
Fig. 1 is a longitudinal cross-sectional view of a tool constructed in accordance with this invention, the movable components being illustrated in the position which they assume when the cutting blade is at the end of its forward stroke.

Referring to the drawings, the tool comprises a frame in the form of a hollow housing 1 provided with a fore handle 2 and an aft handle 3, which are adapted to be grasped by the operator. Journalled in the aft handle 3 of the housing is a shaft 4 which provides a power drive when it is connected to a suitable power supply by means of a flexible shaft 5.

Mounted for simultaneous rocking movement and reciprocating movement underneath the fore handle 2 of the casing is a blade holding member generally indicated at 6. It includes a rocker 7 which is supported for rocking movement underneath the handle 2 by bearings 8 and 9. Extending upwardly from the rear end of the rocker is a crank 10, at the free end of which is a fork 11. Mounted on the rocker 7 for reciprocating movement in an arcuate path is a slide 12, at the extreme forward end of which is provided a cutting blade or tool 13. V-ways are provided in the opposed surfaces of the rocker and of the slide, and anti-friction ball bearings 14 and 15 are located therein. A strap member 16 is provided to hold the slide against the rocker and V-ways are provided in the opposed surfaces of the strap member and of the slide in which are located anti-friction bearings 17. At the rear end of the slide is a ball and socket assembly 18 which provides a swivel coupling.

On the free end of the shaft 4 is provided a crank pin 19 which is in slidable engagement with the fork 11 of crank 10. Thus, when the crank 10 is rotated, the crank pin will cause the rocker 7 of the blade holding member 6 to rock on bearings 8 and 9, consequently rocking the cutting tool through a total angular distance represented by the symbols x and x' in the drawings.

Obliquely mounted on the shaft 4 is a swash plate mechanism generally indicated at 20, and which is adapted to cause reciprocation of the slide 12 and hence of the cutting tool 13 simultaneously with their rocking movement. The swash plate mechanism includes a ball bearing assembly, the inner race or ring 21 of which is fast to the shaft 4 by means of a transverse pin 22, and the outer ring 23 of which is slidably coupled to the ball and socket assembly 18 by means of a pin 24. It will be appreciated that whilst the inner ring 21 rotates there is no rotary movement of the outer ring, and the outer ring having only a wobbling movement.

The angle and therefore the throw of the swash plate assembly may be varied by axially moving bevel pin 25 through the intermediary of conical-pointed set screw 26. A spring pressed pin 27 applies a stabilizing force to the diametrically opposite side of the swash plate, and furthermore, it absorbs any undue shock to which the cutting blade might be subjected during operation.

Figure 2:
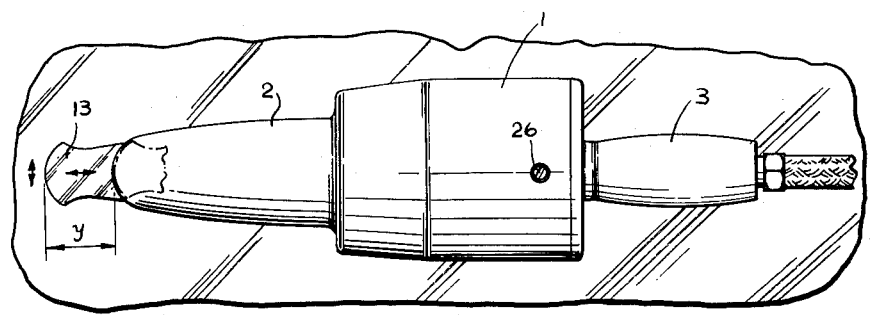
Fig. 2 is a top plan view thereof.
Figure 3:
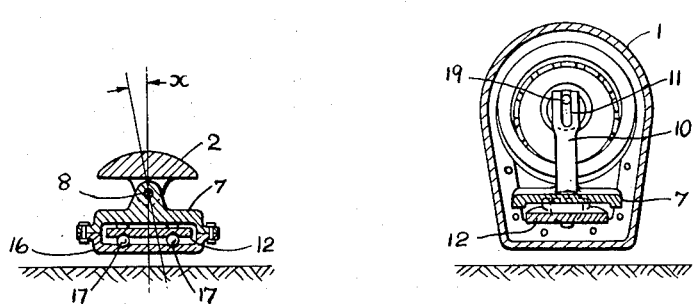
Fig. 3 is a cross-sectional view taken on the line 3—3 of Fig. 1.
Figure 4:
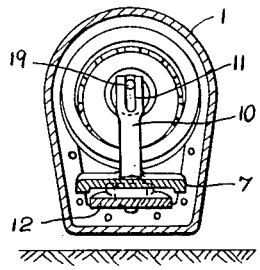
Fig. 4 is a cross-sectional view taken on the line 4—4 of Fig. 1.
Figure 5:
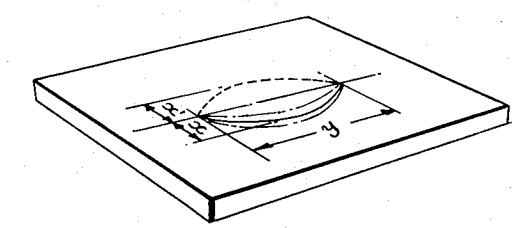
Fig. 5 is a perspective view of a metal plate intended to show (in an exaggerated manner) certain characteristics of the cut made by the tool, as hereinafter will be described.
Figure 6:
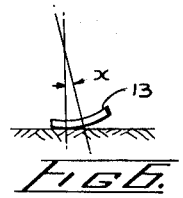
Fig. 6 is a front view of the cutting blade, intended to illustrate the rocking component of the cut.

In operation, rotation of shaft 4 transmits to the blade holding member 6 a reciprocating movement combined with a rocking movement. The action of the cutting blade is graphically illustrated in Fig. 5 of the drawings, in which the length of the reciprocating stroke is depicted by the symbol y (see also Fig. 2), whilst the symbols x and x' show the magnitude of the rocking movement. In Fig. 5, the actual path of the blade during its forward stroke is shown by the curved solid line whilst the chain-dotted lines at each side of the curved solid line show the width of the cut; it will be observed that the cut at the beginning and at the end of the cutting stroke taper into the surface of the metal. The dotted line in Fig. 5 illustrates the path of the blade during the return stroke; of course, the blade is not cutting during the return stroke. During the return stroke the blade has an angular movement or rock of a magnitude x' equal to the angular movement x during the cutting stroke.

It is to be understood that the form of the invention herewith shown and described, is to be taken as a preferred example of the same, and that various changes in the shape, size and arrangement of the parts may be resorted to, without departing from the spirit of the invention or the scope of the subjoined claims.

What I claim as my invention is:

1. A power-operated hand tool for scraping and feathering, comprising a frame member, a shaft rotatably mounted on the frame member and adapted to be connected to a power drive, a crank on the shaft, a blade holding member mounted on the frame for rocking movement about an axis eccentric with respect to the shaft axis and also for simultaneous reciprocation in the general direction of the shaft axis, a crank on the blade holding member slidably coupled to the first mentioned crank whereby rotation of the first mentioned crank rocks the blade holding member, a swash plate mechanism actuated by the rotation of the shaft, and a coupling between the blade holding member and the swash plate mechanism whereby the rotation of the shaft causes reciprocation of the blade holding member.

2. A power-operated hand tool for scraping and feathering, comprising a frame member, a shaft rotatably mounted on the frame member and adapted to be connected to a power drive, a crank on the shaft, a blade holding member including a rocker mounted on the frame for rocking movement about an axis eccentric with respect to the shaft axis and a slide slidably mounted on the rocker for reciprocating movement relative to the rocker, a crank on the rocker slidably coupled to the first mentioned crank whereby rotation of the first mentioned crank rocks the blade holding member, a swash plate mechanism actuated by the rotation of the shaft, and a coupling between the slide and the swash plate mechanism whereby the rotation of the shaft causes reciprocation of the blade holding member.

3. A power-operated hand tool for scraping and feathering comprising a frame member, a shaft rotatably mounted on the frame member and adapted to be connected to a power drive, a crank on the shaft, a blade holding member including a rocker mounted on the frame for rocking movement about an axis eccentric with respect to the shaft axis and a slide slidably mounted on the rocker for reciprocating movement relative to the rocker, a crank on the rocker slidably coupled to the first mentioned crank whereby rotation of the first mentioned crank rocks the blade holding member, a swash plate mechanism including a wobbling element and a rotating element rotatably mounted in the wobbling element, the rotating element being fast on the shaft and the wobbling element being coupled to the slide to reciprocate the blade holding member as it rocks.

4. A power-operated hand tool for scraping and feathering comprising a frame member, a shaft rotatably mounted on the frame member and adapted to be connected to a power drive, a crank on the shaft, a blade holding member including a rocker mounted on the frame for rocking movement about an axis eccentric with respect to the shaft axis and a slide slidably mounted on the rocker for reciprocating movement relative to the rocker, a crank on the rocker slidably coupled to the first mentioned crank whereby rotation of the first mentioned crank rocks the blade holding member, a swash plate mechanism including an inner ring mounted obliquely on the shaft and rotatable therewith and an angularly stationary outer ring in which the inner ring is rotatably mounted, rotation of the inner ring causing a wobble movement of the outer ring, and a sliding swivel coupling between the outer ring and the slide, whereby the wobble movement of the outer ring causes reciprocation of the slide.

5. A power operated hand tool for scraping or feathering, comprising a frame member, a shaft rotatably mounted on the frame and adapted to be connected to a power drive, a crank on the shaft, a swash plate mechanism including an inner ring mounted obliquely on the shaft and rotatable therewith and an angularly stationary outer ring in which the inner ring is free to rotate thereby wobbling the outer ring, a blade holding member including a rocker mounted on the frame for rocking movement about an axis angularly misaligned relative to the shaft axis and a slide slidably mounted onto the rocker for reciprocating movement, a crank extending from the rocker and slidably coupled to the first mentioned crank whereby rotation of the first mentioned crank rocks the blade holding member, and a sliding swivel coupling between the slide and the outer ring whereby rotation of the shaft reciprocates the blade holding member.

6. A power-operated hand tool for scraping and feathering, comprising a frame member, a shaft rotatably mounted on the frame and adapted to be connected to a power drive, a crank on the shaft, a blade holding member including a rocker mounted on the frame for rocking movement about an axis angularly misaligned relative to the shaft axis and a slide slidably mounted onto the rocker for reciprocating movement, a crank extending from the rocker and slidably coupled to the first mentioned crank whereby rotation of the first mentioned crank rocks the blade holding member, a swash plate mechanism actuated by the rotation of the shaft, and a coupling between the slide and the swash plate mechanism whereby rotation of the shaft reciprocates the blade holding member.

References Cited in the file of this patent

UNITED STATES PATENTS

| | | |
|---|---|---|
| 860,386 | Jordan | July 16, 1907 |
| 2,503,539 | Aspeek | Apr. 11, 1950 |